United States Patent
Gouget

(10) Patent No.: US 12,273,436 B2
(45) Date of Patent: Apr. 8, 2025

(54) METHOD FOR TESTING IF A DATA ELEMENT BELONGS TO A LIST OF REFERENCE DATA ELEMENTS

(71) Applicant: THALES DIS FRANCE SAS, Meudon (FR)

(72) Inventor: Aline Gouget, Issy les Moulineaux (FR)

(73) Assignee: THALES DIS FRANCE SAS, Meudon (FR)

( * ) Notice: Subject to any disclaimer, the term of this patent is extended or adjusted under 35 U.S.C. 154(b) by 210 days.

(21) Appl. No.: 17/798,945

(22) PCT Filed: Feb. 10, 2021

(86) PCT No.: PCT/EP2021/053240
§ 371 (c)(1),
(2) Date: Aug. 11, 2022

(87) PCT Pub. No.: WO2021/170411
PCT Pub. Date: Sep. 2, 2021

(65) Prior Publication Data
US 2023/0068650 A1    Mar. 2, 2023

(30) Foreign Application Priority Data
Feb. 25, 2020    (EP) .................... 20305175

(51) Int. Cl.
*H04L 9/00*    (2022.01)
*G06F 21/60*    (2013.01)

(52) U.S. Cl.
CPC ............ *H04L 9/008* (2013.01); *G06F 21/602* (2013.01)

(58) Field of Classification Search
USPC ........................................................ 713/168
See application file for complete search history.

(56) References Cited

U.S. PATENT DOCUMENTS 8,515,058 B1 *    8/2013    Gentry ................... H04L 9/008
                                                              380/28
2017/0293913 A1 *  10/2017   Gulak ................... G16H 10/40
(Continued)

FOREIGN PATENT DOCUMENTS

EP        3334083 A1 *   6/2018    ............ H04L 9/008

OTHER PUBLICATIONS

International Search Report (PCT/ISA/210) and Written Opinion (PCT/ISA/237) mailed on Apr. 29, 2021, by the European Patent Office as the International Searching Authority for current International Application No. PCT/EP2021/053240—[15 pages].

*Primary Examiner* — Sanchit K Sarker

(57) ABSTRACT

Provided is a method for testing if a candidate data element, belongs to a list of reference data elements, performed by a client device (102) and comprising the steps of generating an encrypted candidate data element (y') by encrypting said candidate data element (x') with a leveled fully homomorphic encryption scheme, transmitting said encrypted candidate data element (y') to a server device (103), storing said reference data elements ($x_i$) receiving, from said server device, a delta value depending on a product of differences, decrypting said delta value with said leveled fully homomorphic encryption scheme, based on said decrypted delta value, determining whether said candidate data element (x') belongs to said list of reference data elements ($x_i$). Other embodiments disclosed.

7 Claims, 2 Drawing Sheets

(56) References Cited

U.S. PATENT DOCUMENTS

2018/0198601 A1\* 7/2018 Laine .................... H04L 9/3239
2020/0074548 A1\* 3/2020 Aidoo .................. G06Q 20/383

\* cited by examiner

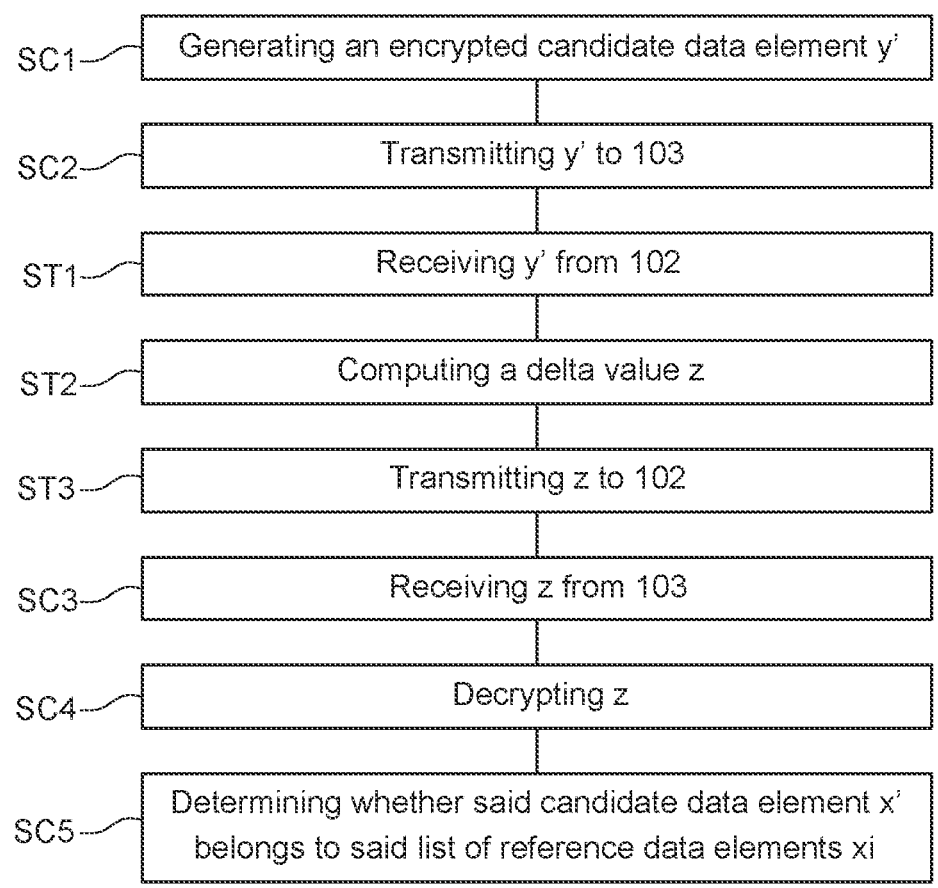

METHOD FOR TESTING IF A DATA ELEMENT BELONGS TO A LIST OF REFERENCE DATA ELEMENTS

FIELD OF THE INVENTION

The present invention relates to the field of cryptography and data protection in a cloud environment, and of associated cryptographic devices, and more particularly to a method enabling to delegate the checking of the belonging of a confidential data to a list while protecting the confidentiality of the data, the list and the result of the comparison.

BACKGROUND OF THE INVENTION

A lot of applications in various domain need to be able to determine at some point if a given element belongs or not to a list of elements, especially in the field of cybersecurity. Such a list may for example be a white list of authorized elements or a black list of forbidden elements. Such applications may for example check if a user has rights to enter a room, access a file or modify some data; check if a certificate belongs to a revocation list; check if a website belongs to a list of authorized or banned web sites.

When such a list is long, the computational power and/or time needed to check if an element belongs to such a list may become important. Devices with low computational power such as smartcards, smartphones or laptops may then benefit from delegating such a verification to a distant device with bigger resources, such as a server in the cloud.

Such a delegation may be a threat to the confidentiality of both the candidate element and the list versus which it is checked, when the distant device performing the verification may be compromised and cannot be trusted.

Consequently, there is a need for a method enabling to delegate to a distant device the checking of the belonging of a confidential data to a list while protecting the confidentiality of the data, of the list and of the result of the comparison.

SUMMARY OF THE INVENTION

For this purpose and according to a first aspect, this invention therefore relates to a method for testing if a data element, called candidate data element, belongs to a list of reference data elements, performed by a client device and comprising the steps of:
generating an encrypted candidate data element by encrypting said candidate data element with a leveled fully homomorphic DGHV (Dijik, Gentry, Halevi, Vaikuntanathan) encryption scheme,
transmitting said encrypted candidate data element to a server device storing said reference data elements encrypted with said leveled fully homomorphic DGHV encryption scheme, called encrypted reference data elements,
receiving, from said server device, a delta value depending on a product of differences between said encrypted candidate data element and each of said encrypted reference data elements,
decrypting said delta value with said leveled fully homomorphic DGHV encryption scheme,
based on said decrypted delta value, determining whether said candidate data element belongs to said list of reference data elements, said leveled fully homomorphic DGHV encryption scheme being such that a ciphertext $y_i$ of a data $x_i$ in $[0; n[$, i, n being integers, FHE (Fully homomorphic Encryption) encrypted with a FHE secret key p, is equal to $q_i \cdot p + n \cdot r_i + x_i$ where $q_i$ and $r_i$ are random integers, and such that the ciphertext $y_i$ is decrypted by computing $x_i = (y_i \bmod p) \bmod n$.

It enables the client device to delegate the checking operation without disclosing to the server device the value of the candidate data element and without enabling the server device to gain knowledge of the result of the comparison.

According to a second aspect, this invention therefore relates also to a method for testing if a data element, called candidate data element, belongs to a list of reference data elements, said method being performed by a server device storing said reference data elements encrypted with a leveled fully homomorphic DGHV (Dijik, Gentry, Halevi, Vaikuntanathan) encryption scheme, called encrypted reference data elements, and comprising the steps of:
receiving, from a client device, an encrypted candidate data element obtained by encryption of said candidate data element with said leveled fully homomorphic DGHV encryption scheme,
computing a delta value depending on a product of differences between said encrypted candidate data element and each of said encrypted reference data elements,
transmitting said computed delta value to said client device,
such that, after decrypting of said delta value with said leveled fully homomorphic DGHV encryption scheme, the client device is able to determine whether said candidate data element belongs to said list of reference data elements, based on said decrypted delta value,
said leveled fully homomorphic DGHV encryption scheme being such that a ciphertext $y_i$ of a data $x_i$ in $[0; n[$, i, n being integers, FHE (Fully homomorphic Encryption) encrypted with a FHE secret key p, is equal to $q_i \cdot p + n \cdot r_i + x_i$ where $q_i$ and $r_i$ are random integers, and such that the ciphertext $y_i$ is decrypted by computing $x_i = (y_i \bmod p) \bmod n$.

It enables the server device to test the belonging of the candidate data element to the list without having itself access to the values of the reference data elements against which the candidate data element is tested, nor to the result of the test.

In an embodiment, said delta value z may be equal to $(y_i - y') * (y_2 - y') \ldots (y_T - y')$ or may be equal to $(y_1 - y') * (y_2 - y') \ldots (y_T - y')$ modulo $y_0$ where $y_0 = p * q_0 + r_0 * n$ with $|q_0| > |q_i|$, with $y_i, \ldots, y_T$ said encrypted reference data elements and y' said encrypted candidate data element, with T an integer and $1 \le i \le T$, and the step of determining whether said candidate data element belongs to said list of reference data elements may comprise comparing said decrypted delta value with 0 and, when said decrypted delta value is different from 0, then said candidate data element does not belong to the list of reference data elements, and when said decrypted delta value is equal to 0, said candidate data element belongs to the list of reference data elements.

It enables the client device to determine easily if the candidate data element belongs to the list based on the delta value computed by the server device. It enables also to set the parameters of the DVHG scheme such that the scheme only copes with one multiplication while still preserving the capacity of the client device to determine if the candidate data element belongs to the list based on the transmitted delta value.

Said reference data elements may be plaintext data or hashes of plaintext data.

Said reference data element are IBANs (International Bank Account Number) or hashes of IBANs.

According to a third aspect, this invention therefore relates also to a computer program product directly loadable into the memory of at least one computer, comprising software code instructions for performing the steps of the methods according to the first or second aspect when said product is run on the computer.

According to a fourth aspect, this invention therefore relates also to a client device comprising a processor and an interface configured to perform the steps of the method according to the first aspect.

According to a fifth aspect, this invention therefore relates also to a server device comprising a memory storing reference data elements encrypted with a leveled fully homomorphic DGHV (Dijik, Gentry, Halevi, Vaikuntanathan) encryption scheme, a processor and an interface configured to perform the steps of the method according to the second aspect.

According to a sixth aspect, the invention relates also to a system comprising a client device according to the fourth aspect and a server device according to the fifth aspect.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

FIG. 3 illustrates schematically a method for testing if a candidate data element belongs to a list of reference data elements, according to an embodiment of the present invention.

DETAILED DESCRIPTION OF EMBODIMENTS OF THE INVENTION

Figure 1:
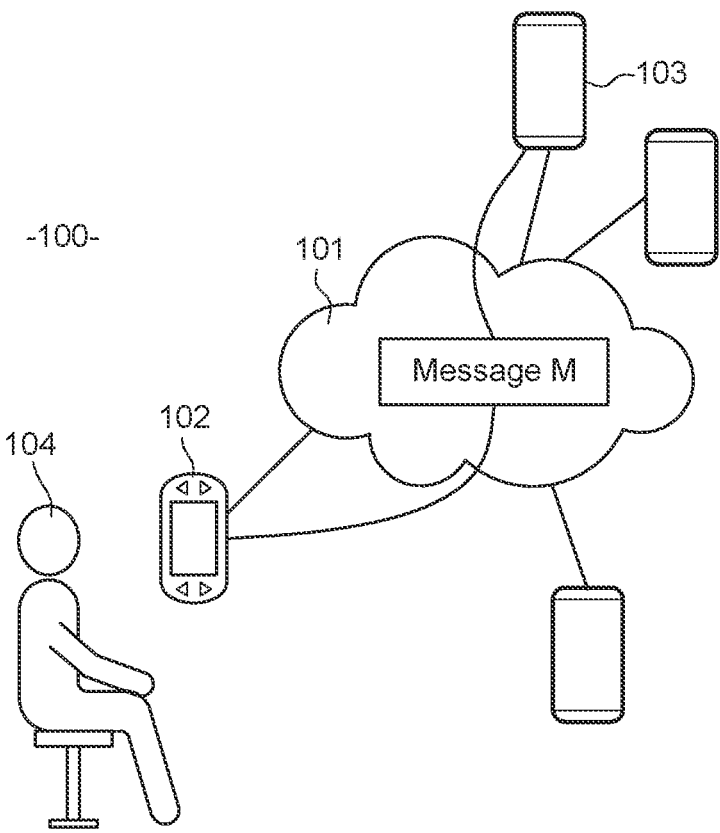
FIG. 1 is a schematic illustration of a system comprising a client device and one or more remote servers according to an embodiment of the present invention.

The invention aims at solving the issue of enabling a client device to delegate to a distant server device the testing of the belonging of a confidential data element, called candidate data element, to a list of reference data elements while protecting the confidentiality of the candidate data element, of the list and of the result of the comparison, at a cost low enough to make practical implementation possible on currently existing common computation devices.

The candidate data element and the reference data elements may be plaintext data. For example, they may be IBAN (International Bank Account Number) numbers and the method according to the invention may be used to determine if a bank account belongs to a white list or black list of bank accounts to/from which money transfers are authorized/forbidden. Alternatively, they may be user identifiers and the method according to the invention may be used to determine if a user is authorized to access a facility or digital resource. Alternatively, they may be digital certificate identifiers and the method according to the invention may be used to determine if a candidate certificate is still valid or if it has been revoked by a certificate authority. Alternatively, they may be passwords and the method according to the invention may be used to determine if a password is already used or has been used recently.

Instead of being plaintext data, the candidate data element and the reference data elements may be hashes of such plaintext data.

In order to protect the confidentiality of any element provided to the server device, either the candidate data element or reference data elements, a first core idea of the invention is to encrypt it with a levelled fully homomorphic encryption scheme. Such a scheme, thanks to its homomorphic properties, enables to perform an operation on encrypted data without prior decryption of these and to get as a result an encrypted value of the output of this operation as if it had been applied to decrypted data. Consequently, the server in charge of performing the computations needed to determine if the candidate data element belongs to the list, may perform the required operations directly on encrypted data, without ever decrypting it and therefore without having access to the value of the candidate data element and of the reference data elements of the list.

In the following paragraphs, the expressions "HE" or "homomorphic" used as adjectives are used to qualify data encrypted by an encryption operation of said Homomorphic Encryption scheme or to qualify operations performed on such encrypted data.

A problem of homomorphic encryption schemes is the cost of the operations to be performed on homomorphically encrypted data. Fully homomorphic encryption schemes imply complex calculations which come with a heavy cost. Levelled encryption schemes may be simpler but the size of the parameters of such schemes, such as the key length, must be raised as the depth of the circuit to be assessed grows, in order to keep the results accurate. If such a levelled scheme is used to encrypt the reference data elements of the list, when new reference data elements are added to the list, the depth of the circuit grows by one for each new data element and all the reference data elements of the list have to be re-encrypted using updated scheme parameters.

In order to keep the size of the parameters of the scheme low, the second main idea of the invention is to check the belonging of a candidate data element to a list of reference data elements by computing the product of the differences between the candidate data element and each of the reference data elements of the list. Indeed, such a product becomes null when the candidate element belongs to the list. In addition, when such a computation is performed on FHE-encrypted values, decrypting the result will always return null when the candidate element belongs to the list, whatever the size of the parameters of the scheme as long as the parameter set has been selected to support at least one homomorphic multiplication. As a result, the parameters may be chosen such that the scheme is accurate for evaluating the result of just a single multiplication. In such a case, when the candidate element does not belong to the list, the result of the computation of the homomorphic product of the differences between the candidate data element and each of the reference data elements of the list cannot be guaranteed as accurate but this not an issue since in that case the value of the product has no interest, except that it is not null. For a better comprehension, examples will be given in the following paragraphs.

In the rest of the description, the method according to the invention is described as using the leveled fully homomorphic encryption scheme known as DGHV (Dijik, Gentry, Halevi, Vaikuntanathan) scheme (("Fully Homomorphic Encryption over the Integer", Dijk and al. [DGHV]). Based on this description, the invention could be implemented using other levelled fully homomorphic encryption schemes such as BGV ("(Leveled) Fully Homomorphic Encryption without Bootstrapping", Brakerski and al.).

FIG. 1 is a schematic illustration of system 100 comprising a network 101 connecting a client device 102 such as a smartcard, a mobile telephone, a tablet, or a personal computer, to a server device 103. The client device 102 is operated by a user 104 and interacts with the server device to delegate to the server device the checking of the belonging of a candidate data element to a list of reference data elements.

Figure 2:
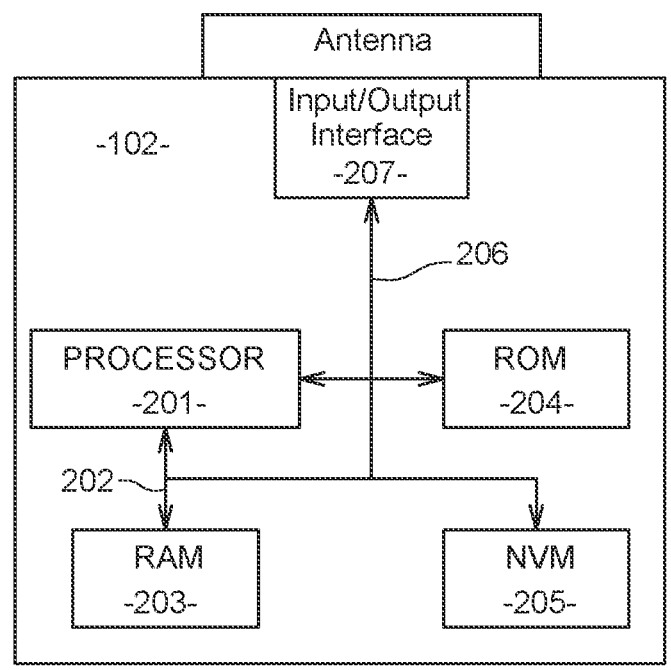
FIG. 2 is a schematic illustration of a client device according to an embodiment of the present invention.

FIG. 2 is a schematic illustration of a client device 102. The client device 102 may include a processor 201 connected via a bus 202 to a random access memory (RAM) 203, a read-only memory (ROM) 204, and/or a non-volatile memory (NVM) 205. The client device 102 may further include a communication interface 206 by which the client device 102 may be connected to the network 101. Such an interface may be a wireless interface connected to an antenna and may be used to connect the client device 102 to various forms of wireless networks, e.g., wide-area networks, WiFi networks, or mobile telephony networks. Alternatively, such an interface may be a wired interface such as an Ethernet internet. The client device may also include input/output means 207 providing interfaces to the user of the client device, such as one or more screens, loudspeakers, a mouse, tactile surfaces, a keyboard etc.

The server device 103 has the same kind of architecture and may include the same elements as the client device (301, . . . ).

The following paragraphs describe the steps SC of a method for testing if a candidate data element x' belongs to a list of reference data elements, performed by the client device 102, according to a first aspect of the invention as depicted on FIG. 3; and the steps ST of a method for testing if the candidate data element x' belongs to the list of reference data elements, performed by the server device 103. In the following description, the list of reference data elements is supposed to include T elements with T an integer, and the reference data elements are noted $x_i$ with $1 \leq i \leq T$.

In a first client step SC1, the processor of the client device generates an encrypted candidate data element y' by encrypting said candidate data element x' with the leveled fully homomorphic DGHV encryption scheme.

y'=p*q+r*n+x' with p the secret key of the DGHV scheme
q and r random integers according to DGHV specs
n an integer such that $x_i$ in [0; n[ for $1 \leq i \leq T$.

In a second client step SC2, the client device transmits said encrypted candidate data element y' to the server device storing said reference data elements $x_i$ encrypted with the leveled fully homomorphic DGHV encryption scheme, called encrypted reference data elements $y_i$.

$y_i = p*q_i + r_i*n + x_i$ with p the secret key of the DGHV scheme
$q_i$ and $r_i$ random integers according to DGHV specs
$1 \leq i \leq T$.

The coefficients $q_i$ and q may be large numbers randomly chosen for each new encryption and the coefficient $r_i$ and r may be small numbers randomly chosen for each new encryption.

In a first server step ST1, the server device receives, from the client device 102, the encrypted candidate data element y' obtained by encryption of said candidate data element x' with said leveled fully homomorphic DGHV encryption scheme.

In a second server step ST2, the server device computes a delta value z depending on the product of the differences between the encrypted candidate data element y' and each of the encrypted reference data elements $y_i$ he has stored. For example, when the delta value z is equal to this product, it may read $z = \Pi_{i=1}^{T}(y_i - y')$.

Alternatively, $z = \Pi_{i=1}^{T}(y_i - y') \mod y_0$ with $y_0 = p*q_0 + r_0*n$ where $q_0$ and $r_0$ are random integers and $q_0$ is such that $|q_0| > |q_i|$, $1 \leq i \leq T$.

Since the candidate data element and the reference data elements are all FHE-encrypted, the delta value z depends on the random numbers q, r, $q_i$ and $r_i$ used when the data elements were encrypted. As a result, the server device cannot draw any information from the delta value z and cannot determine if the candidate data element belongs or not to the list of reference data elements.

In a third server step ST3, the server device transmits the computed delta value z to said client device 102.

In a third client step SC3, the client device receives from the server device 103 the delta value z depending on the product of the differences between the encrypted candidate data element y' and each of the encrypted reference data elements $y_i$.

In a fourth client step SC4, the client device decrypts the delta value with said leveled fully homomorphic DGHV encryption scheme. In DGHV scheme, a ciphertext $y_i$ is decrypted by computing $x_i = (y_i \mod p) \mod n$.

When the delta value $z = \Pi_{i=1}^{T}(y_i - y')$, such a decryption may be performed by computing (z mod p) mod n.

In a fifth client step SC5, the client device determines based on the decrypted delta value whether the candidate data element x' belongs to said list of reference data elements $x_i$.

In order to do so, when the delta value $z = \Pi_{i=1}^{T}(y_i - y')$, the client device may compare the decrypted delta value with 0 and, when the decrypted delta value is different from 0, then the candidate data element x' does not belong to the list of reference data elements $x_i$, and when the decrypted delta value is equal to 0, said candidate data element x' belongs to the list of reference data elements $x_i$.

Indeed, when the candidate data element x' is equal to a reference data element $x_j$ of the list, we have $y_j - y' = p*(q_j - q) + (r_j - r)*n$. Therefore the value $\Pi_{i=1}^{T}(y_i - y')$ may be re-written as $A*p + B*n$ with $A = (q_j - q)*\Pi_{i \neq j, i=1}^{T}(y_i - y')$ and $B = (r_j - r)*\Pi_{i \neq j, i=1}^{T}(y_i - y')$. When the delta value $z = \Pi_{i=1}^{T}(y_i - y')$, decrypting it by computing (z mod p) mod n gives a null value (high probability means (1−1/n)).

Such a way of determining if the candidate data element belongs to the list of reference data elements is effective even when the length of the parameters of the DGHV scheme is only big enough to cope with a depth of one multiplication. In such a case, when $z = \Pi_{i=1}^{T}(y_i - y')$, the decryption of z will output a wrong value: (z mod p) mod n will often not be equal to $z = \Pi_{i=1}^{T}(y_i - y')$. But it doesn't matter. What matters is that when the candidate data element x' is equal to a reference data element $x_j$ of the list, $z = \Pi_{i \neq j, i=1}^{T}(y_i - y')*[p*(q_j - q) + (r_j - r)*n]$ and (z mod p) mod n=0. Therefore, the size of the parameters of the DGHV scheme and the computation time required to perform encryptions, decryptions and operations on FHE encrypted values is minimized.

In order to prevent the server device from having access to the value of the reference data elements $x_i$ of the list, only the encrypted reference data elements $y_i$ are provided to the server device. As an example, prior to the steps described above, the client device may select, among a set of data elements it stores, the data elements that should form the list of reference data elements. It may then FHE-encrypt said selected data elements and transfer the generated encrypted reference data elements to the server device.

If the client device wishes to update the list of the server device by adding into it a new data element, the client device may generate the corresponding encrypted reference data element and transmit it to the server device so that the server device includes it in its list of encrypted reference data elements against which the encrypted candidate data elements should be checked.

As a result, the method described above enables the client device to delegate the checking of the belonging of the candidate data element to the list of reference data elements stored under a FHE-encrypted form by the server device. The confidentiality of both the data elements and the checking result is ensured since the server device only has access to FHE-encrypted values and cannot deduce from the calculations it performs (computing the delta value) if the candidate data element being tested is indeed included in the list he owns.

The invention claimed is:

1. A method for testing when a data element (x'), called candidate data element, belongs to a list of reference data elements ($x_i$), comprising the steps performed by a client device (102) of:
generating (SC1) an encrypted candidate data element (y') by encrypting said candidate data element (x') with a leveled fully homomorphic DGHV (Dijik, Gentry, Halevi, Vaikuntanathan) encryption scheme;
transmitting (SC2) said encrypted candidate data element (y') to a server device (103) storing said reference data elements ($x_i$) encrypted with said leveled fully homomorphic DGHV encryption scheme, called encrypted reference data elements ($y_i$);
receiving (SC3), from said server device (103), a delta value depending on a product of differences between said encrypted candidate data element (y') and each of said encrypted reference data elements ($y_i$);
decrypting (SC4) said delta value with said leveled fully homomorphic DGHV encryption scheme; and
based on said decrypted delta value, determining (SC5) whether said candidate data element (x') belongs to said list of reference data elements ($x_i$),
said leveled fully homomorphic DGHV encryption scheme being such that a ciphertext $y_i$ of a data $x_i$ in [0; n], i, n being integers, FHE (Fully homomorphic Encryption) encrypted with a FHE secret key p, is equal to $q_i \cdot p + n \cdot r_i + x_i$ where $q_i$ and $r_i$ are random integers, and such that the ciphertext $y_i$ is decrypted by computing $x_i = (y_i \bmod p) \bmod n$;
the method further comprising the steps performed by the server device of: receiving (ST1), from said client device (102), said encrypted candidate data element (y') obtained by encryption of said candidate data element (x') with said leveled fully homomorphic DGHV encryption scheme;
computing (ST2) said delta value (z) depending on a product of differences between said encrypted candidate data element (y') and each of said encrypted reference data elements ($y_i$);
transmitting (ST3) said computed delta value (z) to said client device (102), wherein said delta value z equals to $(y_1-y')*(y_2-y') \ldots (y_T-y')$ or equals to $(y_1-y')*(y_2-y') \ldots (y_T-y')$ modulo $y_0$ where $y_0 = p*q_0 + r_0*n$ with $|q_0| > |q_i|$, with $y_1, \ldots y_T$ said encrypted reference data elements and y' said encrypted candidate data element, with T an integer and $1 \leq i \leq T$, and
determining whether said candidate data element (x') belongs to said list of reference data elements ($x_i$) comprises comparing said decrypted delta value with 0 and, when said decrypted delta value is different from 0, then said candidate data element (x') does not belong to the list of reference data elements ($x_i$), and when said decrypted delta value is equal to 0, said candidate data element (x') belongs to the list of reference data elements ($x_i$).

2. The method of claim 1, wherein said reference data elements ($x_i$) are plaintext data or hashes of plaintext data.

3. The method of claim 2, wherein said reference data element ($x_i$) are IBANs (International Bank Account Number) or hashes of IBANs.

4. The method of claim 3, wherein a computer program product is directly loadable into a memory of at least one computer, comprising software code instructions for performing the method steps when said product is run on the computer.

5. The method of claim 3, wherein a client device (102) comprising a processor (201) and an interface (207) is configured to perform the method steps.

6. The method of claim 3, wherein a server device (103) comprising a memory (303, 304, 305) storing reference data elements (xi) encrypted with a leveled fully homomorphic DGHV (Dijik, Gentry, Halevi, Vaikuntanathan) encryption scheme, a processor (301) and an interface (307) is configured to perform the method steps.

7. A system (100) for testing when a data element (x'), called candidate data element, belongs to a list of reference data elements ($x_i$), comprising
a client device (102) comprising a processor and an interface configured to perform the method steps of:
generating (SC1) an encrypted candidate data element (y') by encrypting said candidate data element (x') with a leveled fully homomorphic DGHV (Dijik, Gentry, Halevi, Vaikuntanathan) encryption scheme;
transmitting (SC2) said encrypted candidate data element (y') to a server device (103) storing said reference data elements ($x_i$) encrypted with said leveled fully homomorphic DGHV encryption scheme, called encrypted reference data elements ($y_i$);
receiving (SC3), from said server device (103), a delta value depending on a product of differences between said encrypted candidate data element (y') and each of said encrypted reference data elements ($y_i$);
decrypting (SC4) said delta value with said leveled fully homomorphic DGHV encryption scheme;
based on said decrypted delta value, determining (SC5) whether said candidate data element (x') belongs to said list of reference data elements ($x_i$);
said leveled fully homomorphic DGHV encryption scheme being such that a ciphertext $y_i$ of a data $x_i$ in [0; n [, i, n being integers, FHE (Fully homomorphic Encryption) encrypted with a FHE secret key p, is equal to $q_i \cdot p + n \cdot r_i + x_i$ where $q_i$ and $r_i$ are random integers, and such that the ciphertext $y_i$ is decrypted by computing $x_i = (y_i \bmod p) \bmod n$, and
said server device (103) storing said reference data elements ($x_i$) encrypted with said leveled fully homomorphic DGHV (Dijik, Gentry, Halevi, Vaikuntanathan) encryption scheme, called encrypted reference data elements ($y_i$) and configured to perform the method steps of:

receiving (ST1), from said client device (102), said encrypted candidate data element (y') obtained by encryption of said candidate data element (x') with said leveled fully homomorphic DGHV encryption scheme;

computing (ST2) said delta value (z) depending on a product of differences between said encrypted candidate data element (y') and each of said encrypted reference data elements ($y_i$);

transmitting (ST3) said computed delta value (z) to said client device (102); wherein said delta value z equals to $(y_1-y')*(y_2-y') \ldots (y_t-y')$ or equals to $(y_1-y')*(y_2-y') \ldots (y_t-y')$ modulo $y_0$ where $y_0 = p*q_0 + r_0*n$ with $|q_0| > |q_i|$, with $y_1, \ldots, y_T$ said encrypted reference data elements and y' said encrypted candidate data element, with T an integer and $1 \le i \le T$, and determining whether said candidate data element (x') belongs to said list of reference data elements ($x_i$) comprises comparing said decrypted delta value with 0 and, when said decrypted delta value is different from 0, then said candidate data element (x') does not belong to the list of reference data elements ($x_i$), and when said decrypted delta value is equal to 0, said candidate data element (x') belongs to the list of reference data elements ($x_i$).

* * * * *